United States Patent [19]

Werth et al.

[11] Patent Number: 4,803,021

[45] Date of Patent: Feb. 7, 1989

[54] ULTRAVIOLET LASER TREATING OF MOLDED SURFACES

[75] Inventors: Dennis L. Werth, Willow Springs; Virupaksha K. Reddy, Naperville, both of Ill.

[73] Assignee: Amoco Corporation, Chicago, Ill.

[21] Appl. No.: 34,794

[22] Filed: Apr. 3, 1987

Related U.S. Application Data

[63] Continuation-in-part of Ser. No. 829,794, Feb. 14, 1986, abandoned.

[51] Int. Cl.$^4$ .............................................. B29C 71/04
[52] U.S. Cl. .................................... 264/25; 219/121.6; 219/121.68; 219/121.69; 219/121.85; 264/37; 264/80; 264/139; 264/340
[58] Field of Search ....................... 264/22, 80, 37, 38, 264/39, 25, 340–344, 334, 139, 317; 219/121 L, 121 LH, 121 LJ, 121 LM

[56] References Cited

U.S. PATENT DOCUMENTS

| | | | |
|---|---|---|---|
| 4,220,842 | 9/1980 | Sturmer et al. | 219/121 LM |
| 4,247,496 | 1/1981 | Kawakami et al. | 264/22 |
| 4,414,059 | 11/1983 | Blum et al. | 156/643 |
| 4,417,948 | 11/1983 | Mayne-Banton et al. | 156/643 |
| 4,444,701 | 4/1984 | Meguiar | 264/39 |

FOREIGN PATENT DOCUMENTS

| | | | |
|---|---|---|---|
| 211801 | 7/1984 | Fed. Rep. of Germany. | |
| 54-117576 | 9/1979 | Japan | 264/139 |
| 57-22208 | 5/1982 | Japan | 264/25 |
| 58-199788 | 11/1983 | Japan | 264/25 |
| 60-245643 | 12/1985 | Japan. | |
| 60-250915 | 12/1985 | Japan | 264/39 |

*Primary Examiner*—Jeffery Thurlow
*Attorney, Agent, or Firm*—Richard A. Kretchmer; William H. Magidson; Ralph C. Medhurst

[57] ABSTRACT

Ultraviolet laser treatment of molded articles effectively removes surface coatings, such as layers of mold-release agents, in a one-step dry process. Subsequent processing, as by bonding or painting, provides improved and superior quality molded articles in an economic manner.

48 Claims, No Drawings

ULTRAVIOLET LASER TREATING OF MOLDED SURFACES

BACKGROUND OF THE INVENTION

This application is a continuation-in-part of U.S. Ser. No. 829,794, filed Feb. 14, 1986, now abandoned.

FIELD OF THE INVENTION

This invention relates to surface preparation, especially cleaning or priming, by ultraviolet laser treatment of molded articles or components, whose surfaces are to be subjected to further processing, such as bonding or painting.

DESCRIPTION OF THE ART

Molded compositions, including plastic compositions, generally require the use of a mold-release agent in processing to facilitate removal from the mold. It is usually necessary to bond or paint such molded compositions during subsequent processing steps. Bonding to the plastic surface is poor unless the mold-release agent is first removed.

The use of "internal" mold-release agents involves intimate mixing of the selected agent with the substrate to be molded as finely-divided solids, especially as powders. During subsequent heating under pressure in the mold, much of the release agent migrates to the surface of the mold so that upon removal from the mold the molded object tends to be coated with a thin layer, or film, of the selected mold-release agent. In contrast, "external" mold-release agents are initially coated on the surface of the mold so that, upon removal from the mold, the molded object has most of the selected mold-release agent on its surface.

In conventional processing, mold-release agents typically include materials such as a paraffin wax, compounds such as zinc stearate, or polymeric substances such as silicones. Such typical mold-release agents are customarily removed in a "wet" chemical wash process. Such processing is energy- and labor-intensive and employs chemicals which may constitute an environmental problem. In the subsequent drying step, migration of remaining mold-release agent to the surface is often experienced. This, in turn, leads to high rejection rates in later painting or bonding operations due to poor or inconsistent surface quality in the molded product after washing.

Plastic materials have been replacing metals in many consumer products at an increasing rate. Prominent usages are in automobiles, electronic equipment, furniture, and the like. Raw material cost as well as processing cost has been decreased. Newer automobile models employ increasing amounts of plastic parts, including door panels, fenders, hood and trunk sections. Consequently, a major need exists for an improved and more economic means for surface preparation.

While this invention relates to a novel process for surface cleaning or priming of molded compositions in a nonchemical, non-contact manner with little or no thermal effect, lasers have been employed in specific surface treatments in the etching of photoresists and related semiconductor production. Such treatments employ high-energy excimer lasers in the far ultraviolet spectral region.

The use of excimer lasers for photoetching of polymethylmethacrylate films was reported by Y. Kawamura, et al., in *Appl. Phys. Lett.*, vol. 40, pp. 374-5 (1982) and by R. Srinivasan in *J. Vac. Sci. Technol. B*, vol. 1, pp. 923-6 (1983). Employing the ArF laser, emitting 193 nanometer (nm) radiation, ablated material was ejected in large fragments at low fluences while at higher energy levels etching to a depth of about 300 nm could be consistently realized. Similarly, Srinivasan, et al., reported studies on polyethylene terephthalate films in *J. Am. Chem. Soc.*, vol. 104, pp. 6784-5 (1982). Two related U.S. patents have been granted in consequence of these studies; namely, S.E. Blum, et al., U.S. Pat. no. 4,414,059, and V. I. Mayne-Banton, et al., U.S. Pat. no. 4,417,948.

The -059 patent relates to patterning of organic resist materials by selective ablative photodecomposition employing radiation of wavelengths less than 220 nm. The selected power densities caused fragmentation of resist polymer chains with immediate escape of the volatile fragments from the resist layer. The process is stated to be critically dependent upon the wavelength of the applied radiation which should be less than 220 nm. The process is employed in lithography for circuit fabrication.

The -948 patent relates to photoetching of polyesters without causing heating or degradation of the bulk of the polymeric material. Holes about 100 nm deep are created in the polymer film by employing ultraviolet radiation having a wavelength less than 220 nm, the only critical parameter in this process. The process is effective because of the ester linkage in the polyester and hence is limited to operation on such polymers incorporating ester groupings.

SUMMARY OF THE INVENTION

The novel process of this invention relates to the preparation of surfaces of molded products for improved bonding and painting performance. This invention particularly relates to the cleaning or priming of molded plastic surfaces in a one-step, "dry" process employing treatment with ultraviolet laser radiation.

This novel process is particularly effective in the removal of residual films, coatings or surface layers of moldrelease agents, such as a paraffin, a silicone, or zinc stearate, from molded surfaces comprising plastic materials or such materials reinforced with fibers, especially fibers of glass or graphite.

It is an object of this invention to remove both the mold-release agent and a minor portion of the base polymeric material to provide a clean surface for improved adhesion of paint or bonding of other surfaces to said surface within a time period such that no mold-release agent can migrate to the surface prior to said improved bonding operation.

It is another object of this invention to remove both the layer of mold-release agent and a larger portion of the base polymeric material to expose some glass fiber surfaces for especially improved bonding to the surface.

A preferred embodiment of this invention includes the steps of:

(a) introducing the molded composition having its surface coated with a thin film of the mold-release agent, into a treating zone, having a controlled atmosphere;

(b) irradiating the coated surface of the molded composition with ultraviolet radiation, said radiation having sufficient intensity to decompose said mold-release agent to yield diverse decomposition fragments within said treating zone;

(c) removing the diverse fragments of said mold-release agent from said treating zone; and (d) recovering from said treating zone a molded composition having a clean surface, substantially free of mold-release agent.

The ultraviolet radiation source is preferably a pulsed excimer laser, such as a krypton fluoride (248 nm) or xenon chloride (308 nm) laser, scanning the surface of the molded composition at a fluence and pulse length (one or more pulses) to provide sufficient energy density to fragment the mold-release agent coated thereon. In general, the fluence will range between about 0.01 and about 1.0 joule per square centimeter to remove a film layer, including mold-release agent, up to about 500 nm thick. Greater fluences may be employed where necessary.

DESCRIPTION OF THE INVENTION

This invention relates to a novel process for ultraviolet laser treatment of molded surfaces to improve significantly the bonding strength and adherence of coatings thereto.

One embodiment of the process provides a one-step "dry" process for substantially complete removal of mold-release agent from the subject molded surface when sufficient fluence and time are employed in the ultraviolet irradiation to decompose the mold-release agent and eject the evaporated decomposition fragments. The term "mold-release agent" as used herein is understood to include contaminants and other adventitious substances which interfere with bonding to the polymer, or plastic, surface. As used herein, use of the term "ultraviolet radiation" conforms to the definition found in H. Bennett, *Concise Chemical and Technical Dictionary*, (Chemical Publishing Co., New York, 1974) as "light waves shorter than the visible blue-violet waves of the spectrum, having wave lengths of 136–400 Å", or 13.6–400 nm.

In the process of this invention the shape of the molded object remains unchanged. Problems related to solvent removal of mold-release agents are avoided. These include mold-release agent surface migration during drying; exposure to harmful chemicals; trapped solvent, chemicals or water when molded parts are complex in shape.

The process operates by evaporation or decomposition of mold-release film from the molded object surface in a very short time. Associated plastic material in the surface film, or layer, is also removed. The result is greatly improved bonding to the clean molded surface, even though additional mold-release agent may be present internally with the potential for eventual migration to the surface.

In one particular embodiment of this invention the molded composition, having its surface coated with a thin film of mold-release agent, is placed in a controlled treating zone and irradiated wtih ultraviolet radiation having sufficient intensity (joules/cm2/sec) to remove or decompose the moldrelease agent. Decomposition fragments are removed from the controlled zone and the molded composition is thereafter recovered. Its surface is now clean, smoother, and substantially free of mold-release agent.

When removed from the mold, the workpiece is generally coated with a film of mold-release agent, such as a paraffin oil or wax, silicone, or zinc stearate, having a depth, or thickness, within the range from about 50 to about 500 nm. Most often the film thickness ranges from about 100 to about 300 nm.

Irradiation is usually effected with an ultraviolet laser beam, preferably with a pulsed laser beam of the excimer type. Among suitable excimer lasers are argon fluoride (193 nm), krypton fluoride (248 nm), xenon chloride (308 nm), an xenon fluoride (351 nm). Even shorter wavelength lasers should be very effective, but, because of the expensive optics involved with the low wavelength argon fluoride laser, preferred excimer lasers are the krypton fluoride and xenon chloride lasers. Among other lasers radiating in the ultraviolet region, the fourth harmonic of the neodymium-YAG (266 nm) laser is effective and therefore is a preferred laser.

In gneral, pulse length should be less than 1.0 microsecond and preferably may vary from about 15 to about 55 nanoseconds (ns). In one embodiment a pulse length of about 45 ns is preferred. Fluence may vary from about 0.01 to about 1.0 joule/cm$^2$ or even greater, preferably from about 0.04 to about 0.70 J/cm$^2$.

Although pulse lengths in the range from about 15 to about 55 ns have great utility in this process, even shorter pulse lengths can be very effective. With such shorter pulses, the pumping rate exceeds the energy loss rate (by thermal diffusion or relaxation of electronically excited states) so that energy is more efficiently accumulated in the irradiated zone.

Because of their growing use in many types of consumer products, the typical molded composition will comprise a plastic material. Typical plastics include polyurethanes, which may contain glass particles, and polyesters, the latter often being reinforced with a fibrous component such as fibers of glass or graphite. A preferred molded composition comprises a polyester, polyethylene terephthalate (PET), reinforced with glass fibers. This latter composition may also contain an inorganic filler material, such as calcium carbonate.

Generally, the controlled treating zone may be either an open area or an enclosed volume maintained under a partial vacuum or under a gas mixture which may include a partial pressure of oxygen gas. The vacuum assists in rapid removal of decomposition fragments (as vapor) of the mold-release agent and associated polymer material. It is believed that the presence of oxygen may serve to assist in rapid fragmentation by avoiding recombination of radicals whose formation has been induced by the ultraviolet radiation.

The molded articles with which this invention is concerned may exhibit a surface roughness amounting to some 2000 nm. when measured as the extremes of peak to valley. While this degree of roughness is not great for the purposes of this invention, it is far outside the permissible range for the utility disclosed in the prior art. For semiconductors or other circuit fabrication, surfaces must be extremely flat and smooth and etched holes must be defined by sharp boundaries, and steep, perpendicular walls. Such surfaces are not pertinent to the preferred operations of this invention. The process of this invention is concerned with selective removal of surface layers over a wide area, modifying the surface chemistry, rather than precise machining of micro areas to produce highly defined micro features.

Because the process of this invention does not require the extreme surface smoothness of the prior art, less energetic lasers than the ArF excimer laser are preferred because of their lower expense coupled with highly effective characteristics. In exposing the entire surface of the molded object to ultraviolet radiation, a scanning action must be employed. Depending upon the available apparatus configurations, the object surface may be scanned by a programmed movement of either the workpiece or the laser beam.

Although a minor portion of the radiation energy will typically be absorbed by the molded article, very little effect on bulk temperature has been observed so that the process of this invention is normally conducted at substantially ambient temperature. However, temperatures at the point of incidence may be momentarily higher to effect decomposition or evaporation of the surface film of mold-release agent or polymer material.

By exposing the molded surface to an excess of ultraviolet radiation energy over that required for decomposition or evaporation of the mold-release agent, some selective removal of the plastic substrate can occur. When employing a composite of fibers, such as glass fibers, and an organic polymer, such as PET, in the molded article, the process of this invention can selectively strip away portions of the organic polymer to expose clean glass surfaces. Such surfaces exhibit excellent bonding strength, as, for example, for various paints, including acrylic lacquers, and bonding agents.

Surface cleaning, for the purpose of effecting improved bonding of plastic substrates, need not expose glass fibers by etching so deeply as to remove all of the plastic material. However, it does appear necessary to etch deeply enough to have removed substantially all of the mold-release agent. Shear tests run after permitting sufficient time for migration to the surface of internal concentrations of mold-release agent have given poor results which may suggest that bonding operations should occur as soon after laser cleaning of the surfaces as is practicable. It is thus preferred that the treatments be conducted in a substantially concerted manner.

The following examples are illustrative, without limitation, of the novel process of this invention.

EXAMPLE I

An excimer laser beam was generated with a LambdaPhysik laser unit (Models 102 and 201E). The laser pulse width was 15-25 ns. The beam, having a rectangular cross-section of 1 cm × 3 cm was first passed through a copper mask, having a 1 cm × 1 cm square hole. The beam then passed through an attenuat and a Suprasil beam splitter. The reflected beam as directed onto a Joule meter which was connected to a microcomputer which measured the laser pulse energy and controlled the firing of the laser. The transmitted beam was directed onto the workpiece. The Suprasil beam splitter transmittance spectrum was recorded with a UV-Visible spectrometer in the 180-400 nm spectral range.

Plastic sample pieces were prepared from the surface of a Pontiac Fiero door panel (polyurethane with glass platelet reinforcement). Peak to peak roughness was greater than 2000 nm. Each sample piece (2.5 cm diameter) was placed in the beam path and irradiated with 1-100 pulses from the selected excimer laser. In most cases only one pulse was necessary for surface cleaning. Selected lasers operated at wavelengths of 193 nm (ArF), 248 nm (KrF), 308 nm (XeCl), and 351 nm (XeF). Thereafter, the entire sample surface was painted with red acrylic lacquer (Dupont Lucite) mixed with a paint thinner.

The paint first stuck to both the exposed (primed) and unexposed areas. After drying for 24 hours, the paint in the unexposed areas lifted off with masking tape. The paint in the exposed areas could not be removed with masking tape.

The threshold laser fluence, above which paint adhered to the plastic surface was determined for each laser system. Results are presented in Table I.

EXAMPLE II

The laser priming procedure of Example 1 was employed with ArF (193 nm) and KrF (248 nm) lasers. Their fluences were much higher than the threshold fluence for cleaning the plastic. No lens was required to increase the fluence at the sample surface. Energy in the beam was attenuated with an appropriate combination of quartz plates and Schott cutoff filter WG-230. The samples were placed in the reflected beam when low laser fluence was required at the sample surface. Similarly, the sample was placed in the transmitted beam when a higher fluence was required. After radiation, the sample surfaces were painted and treated as in Example I. Effects are presented in Table I.

EXAMPLE III

The laser priming procedure of Example I was employed with XeCl (308 nm) and XeF (351 nm) lasers. Because the laser beam output was lower than the threshold fluence, the attenuator was replaced with a lens. The fluence at the sample surface was varied by changing the distance between sample and lens (moving the sample). The sample surfaces were painted and treated as in Example I.

Paint adhered to the exposed areas at high fluence levels but there was some evidence of a heat affected zone on the sample surface. Effects are presented in Table I.

EXAMPLE IV

The output frequency of the Nd-YAG laser (Quanta Ray Model DCR-30A) was quadrupled using KDP nonlinear crystals to generate laser radiation at 266 nm. Following radiation of the sample, the procedure of Example I was followed.

Paint adhered to the irradiated areas at all fluences higher than the threshold value, included in Table I.

EXAMPLE V

The laser priming procedure of Example I was employed with a XeCl (308 nm) laser in irradiating a glass-filled polyurethane coated with either paraffin wax or zinc stearate as mold-release agent. Release agent removal was essentially complete when either sample was exposed at a fluence of 0.47 J/cm$^2$ and a pulse length of 45 ns.

EXAMPLE VI

The procedure of Example I was followed with a XeCl (308 nm) laser in irradiating a polyester-glass composite coated with zinc stearate. Release agent removal was essentially complete when the sample was exposed at a fluence of 0.64 J/cm$^2$ and a pulse length of 45 ns.

At a fluence of 0.8 J/cm$^2$ selective removal of polyester from the composite was observed, leaving glass fiber surfaces unaffected and exposed. Greater exposure was observed at still higher fluences.

EXAMPLE VII

The procedure of Example I was followed employing sample pieces of sheet molding compound (SMC) taken from a Pontiac Fiero hood panel (roughly equal weight parts of polyester-glass fiber-calcium carbonate). Etch rate per pulse were measured as selected fluences with the observed results as presented in Table II.

EXAMPLE VIII

Hood panel samples, as in Example VII, were treated with laser radiation at selected fluences and thereafter subjected to a bonding test to determine the effectiveness of surface cleaning.

Laer-cleaned sample pieces were bonded together employing a diol-diisocyanate bonding adhesive (Pliogrip-Ashland Oil Company) at ambient temperature to acheive a polyurethane bond. The mixed adhesive was spread over a 1"×1" surface area of laser-treated samples. Glass beads, having 0.02" diameter, were placed in the adhesive to control bond thickness. Two similarly treated samples were then pressed together uniformly and allowed to stand for about 15 minutes. Thereafter, excess adhesive was removed an the samples were baked in an oven at 250° F. for 1 hour.

Shear strength was determined at room temperature and at 180° F. employing an Instron tester, pulling at a rate of 0.5 inch/minute.

Test results at 180° F. are presented in Table III. At room temperature all samples failed at high pressures by a cohesive plastic break in the bulk of the sample piece. At 180° F., three types of breakage were observed, including an interface break between sample piece and adhesive, and a cohesive glue break within the adhesive material, leaving the bond between sample piece and adhesive intact. Tests with the ArF laser indicated failure at the interface between sample and adhesive. Similar results were obtained when bonding was delayed for 1 week after laser treatment.

Molded plastic surfaces for use in this invention are typically exemplified by (1) molded polyurethane articles, generally including glass platelets as filler material, or (2) molded polyester articles, generally including glass fibers and an inorganic filler such as calcium carbonate.

In a preferred process mode for preparing a polyurethane plastic surface for subsequent painting, an excimer laser beam at 248 nm is generated employing krypton fluoride. The resulting laser beam is then passed through attenuators and is split into two beams using a Sprasil beam splitter. A first beam is directed onto a Joule meter. A second beam is directed onto the molded plastic surface in a scanning manner. Firing of the laser and measurement of the pulse energy is effected with a microcomputer. The molded plastic surface is exposed to 5 laser pulses having a pulse width of about 20 ns and a fluence of about 0.045 J/cm². The treated surface is painted within about 3 hours after the laser beam priming operation.

More severe surface treatment is required in preparing a polyester plastic surface for subsequent bonding, employing a KrF excimer laser beam at 248 nm. The surface is exposed to 2 laser pulses having a pulse width of about 20 ns and a fluence of about 0.18 J/cm². This treatment is sufficient to remove the plastic layer that is especially contaminated with mold-release agent but does not remove all of the polyester component to expose the glass fibers. Bonding of treated surfaces is effected promptly, employing a polyurethane adhesive.

Greater laser wavelengths are preferred when the exposure of glass fibers is desired. For example, sheet molding compound is prepared for subsequent bonding employing a XeCl excimer laser (308 nm) at a fluence of about 1.0 J/cm² and a pulse width of about 20 ns. Only 1-2 pulses are required to expose glass fibers, having clearly removed both polyester and calcium carbonate filler. At this wavelength, the optical absorption coefficient is in the range from about $10^2$-$10^3$/cm so that each laser pulse removes 1-3 microns of material.

TABLE I

Threshold Fluence Values[a] vs. Laser Wavelength

| Laser Type | Wavelength (nm) | Threshold Fluence (J/cm2) | Paint Adherence |
|---|---|---|---|
| ArF | 193 | 0.013 | Excellent |
| KrF | 248 | 0.045 | Very good |
| Nd—YAG | 266[b] | 0.05-0.20 | Good |
| XeCl | 308 | >0.5 | Good, but some evidence of heat effect. |
| XeF | 351 | >1.0 | Good, but some evidence of heat effect. |

[a]Polyurethane plastic panel, containing glass platelets.
[b]Fourth harmonic.

TABLE II

Etch Rate vs. Laser Wavelength

| Laser Type | Wavelength (nm) | Fluence (J/cm²) | Pulses (no.) | Etch Rate (microns/pulse) |
|---|---|---|---|---|
| ArF | 193 | 0.44 | 10 | 0.08 |
|  |  |  | 100 | 0.08 |
| KrF | 248 | 0.40 | 10 | 0.14 |
|  |  |  | 100 | 0.13 |
| XeCl | 308 | 0.44 | 10 | 0.65 |
|  |  |  | 100 | 0.17 |
|  |  | 0.80 | 10 | 2.40 |
|  |  |  | 100 | 0.14 |
|  |  | 1.1 | 10 | 1.10 |
| XeF | 351 | 0.77 | 10 | 0.65 |
|  |  |  | 100 | 0.08 |
|  |  | 2.04 | 1 | 7.50 |
|  |  |  | 5 | 7.60 |

TABLE III

Shear Strength Tests

| Laser Type | Wavelength (nm) | Fluence (J/cm²) | Pulses (no.) | Failure[a] (psi) | Failure Type |
|---|---|---|---|---|---|
| ArF | 193 | 0.15 | 1 | 338 | b |
| KrF | 248 | 0.18 | 2 | 347 | c |
|  |  |  | 6 | 390 | d |
|  |  | 0.41 | 1 | 432 | d |
|  |  | 0.43 | 5 | 455 | c |
| KrF[e] | 248 | 0.43 | 5 | 473 | b |
| XeCl | 308 | 1.50 | 1 | 473 | c |
|  |  |  | 5 | 510 | b,c |

[a]Shear test run at 180° F.
[b]Interface break between sample piece and adhesive.
[c]Cohesive plastic break in the bulk of the sample piece.
[d]Cohesive glue break within the adhesive material.
[e]Sample pieces bonded 7 days after laser cleaning.

We claim:
1. A treating process for the removal of a mold-release agent from the surface of a molded composition, comprising the steps of:
(a) introducing the molded composition having its surface coated with a thin film of the mold-release agent, into a treating zone, having a controlled atmosphere;
(b) irradiating the coated surface of the molded composition with ultraviolet radiation, said radiation having sufficient intensity to decompose said mold-release agent to yield diverse decomposition fragments within said treating zone;
(c) removing the diverse fragments of said mold-release agent from said treating zone; and
(d) recovering from said treating zone a molded composition having a clean surface, substantially free of mold-release agent.

2. The process of claim 1 wherein the mold-release agent is paraffin wax or zinc stearate.

3. The process of claim 1 wherein the thin film of the mold-release agent coats the surface of the molded composition to a depth within the range from about 50 to about 500 nanometers.

4. The process of claim 1 wherein the irradiation is effected with a laser beam.

5. The process of claim 4 wherein the laser beam is a pulsed laser beam.

6. The process of claim 1 wherein the irradiation is effected with a pulsed excimer laser beam.

7. The process of claim 6 wherein the pulsed excimer laser beam is afforded by a member of the class consisting of argon fluoride, krypton fluoride, xenon chloride, and xenon flouride lasers.

8. The process of claim 7 wherein the laser beam is afforded by a krypton fluoride laser, having a wavelength of 248 nanometers.

9. The process of claim 7 wherein the laser beam is afforded by a xenon chloride laser, having a wavelength of 308 nanometers.

10. The process of claim 5 wherein the laser beam is afforded by the fourth harmonic of a neodymium-YAG laser, exhibiting a wavelength of 266 nanometers.

11. The process of claim 6 wherein the pulsed excimer laser beam has a pulse length within the range from about 15 to about 55 nanoseconds.

12. The process of claim 11 wherein the pulse length of the excimer laser beam is about 45 nanoseconds.

13. The process of claim 6 wherein the pulsed excimer laser beam has a fluence within the range from about 0.01 to about 1.0 joule per square centimeter.

14. The process of claim 13 wherein the fluence of the excimer laser beam is within the range from about 0.04 to about 0.70 joule per square centimeter.

15. The process of claim 1 wherein the molded composition comprises a plastic material.

16. The process of claim 15 wherein the plastic material is a polyurethane or a polyester.

17. The process of claim 15 wherein the molded composition comprises a polyester reinforced with glass fibers.

18. The process of claim 1 wherein the controlled treating zone atmosphere is maintained under a reduced pressure.

19. The process of claim 1 wherein the controlled treating zone atmosphere includes oxygen gas.

20. A process for preparing the surface of a molded plastic-containing article for subsequent bonding, painting, or other surface-modifying operation, comprising the steps of:
(a) introducing the molded article, having its surface coated with a thin layer of mold-release agent, into preparation zone maintained under controlled conditions of temperature and pressure;
(b) scanning the surface of the molded article within the preparation zone with focused pulsed ultraviolet radiation having sufficient fluence and pulse length to effect fragmentation of the mold-release agent;
(c) removing the fragments of the mold-release agent from the preparaton zone; and
(d) passing the thus-prepared molded plastic-containing article, now substantially free of mold-release agent, directly to a selected surface-modifying treatment zone.

21. The process of claim 20 wherein the preparation zone is maintained at substantially ambient temperature and at a reduced pressure.

22. The process of claim 20 wherein the pulse length of the ultraviolet radiation is within the range from about 15 to about 55 nanoseconds.

23. The process of claim 20 wherein the fluence of the ultraviolet radiation is at least about 0.01 joule per square centimeter.

24. The process of claim 20 wherein the fluence of the ultraviolet radiation is within the range from about 0.04 to about 0.70 joule per square centimeter.

25. The process of claim 20 wherein the ultraviolet radiation consists of an excimer laser beam.

26. The process of claim 25 wherein the excimer laser beam is selected from the class consisting of argon fluoride, krypton fluoride, xenon chloride, and xenon fluoride laser beams.

27. The process of claim 26 wherein the excimer laser beam is a xenon chloride laser beam.

28. The process of claim 26 wherein the excimer laser beam is a krypton fluoride beam.

29. The process of claim 20 wherein the molded article comprises polyurethane and the mold-release agent comprises zinc stearate or paraffin wax.

30. The process of claim 20 wherein the molded article comprises a polyester-glass fiber composite and the mold-release agent comprises zinc stearate.

31. The process of claim 30 wherein the polyester-glass fiber composite additionally comprises calcium carbonate as a filler material.

32. The process of claim 20 wherein the thin layer of the mold-release agent coats the surface of the molded article to a thickness within the range from about 50 to about 500 nanometers.

33. A process for providing improved bonding properties in the surface layer of a molded composite article, comprising at least an organic polymer component and a fiber component, comprising the steps of:
(a) introducing the molded composite article, having its surface layer coated with a thin film of a mold-release agent, into a treating zone;
(b) generating ultraviolet radiation, comprising an excimer laser beam, said laser beam having a fluence of at least about 0.15 joule per square centimeter;
(c) directing the ultraviolet radiation upon the entire surface layer of the molded composite article in the treating zone in a scanning pattern, to effect substantially complete decomposition of the mold-release agent coating thereon together with decomposition of at least a portion of the polymer component contained in said surface layer;
(d) removing the decomposition products from the treating zone; and
(e) recovering the molded composite article from the treating zone, for selected bonding processing.

34. The process of claim 33 wherein the mold-release agent is zinc stearate.

35. The process of claim 33 wherein the organic polymer component is a polyester material.

36. The process of claim 33 wherein the fiber component comprises glass or graphite.

37. The process of claim 33 wherein the organic polymer component is polyethylene terephthalate and the fiber component is glass fiber.

38. The process of claim 33 wherein the excimer laser is a krypton fluoride laser having a wavelength of 248 nanometers.

39. The process of claim 33 wherein the excimer laser is a xenon chloride laser having a wave length of 308 nanometers.

40. The process of claim 33 wherein the excimer laser is a xenon fluoride laser having a wavelength of 351 nanometers.

41. The process of claim 33 wherein the excimer laser beam has a pulse length within the range from about 15 to about 55 nanoseconds.

42. A process for modifying the surface properties of a molded article, having a surface layer, comprising the steps of:
(a) introducing the molded article into a treating zone;
(b) generating ultraviolet radiation, comprising a laser beam;
(c) directing the ultraviolet radiation upon the surface layer of the molded article in the treating zone in a scanning pattern, to effect decomposition of at least a portion of the surface layer;
(d) removing decomposition products from the treating zone; and
(e) recovering the molded article from the treating zone.

43. The process of claim 42 wherein the laser beam is an excimer laser beam.

44. The process of claim 42 wherein the laser beam has a fluence of at least about 0.04 joule per square centimeter.

45. The process of claim 42 wherein the molded article comprises a polyurethane or a polyester material.

46. The process of claim 43 wherein the excimer laser is a krypton fluoride laser having a wavelength of 248 nanometers.

47. The process of claim 43 wherein the excimer laser is a xenon chloride laser having a wavelength of 308 nanometers.

48. The process of claim 43 wherein the excimer laser beam has a pulse length within the range from about 15 to about 55 nanoseconds.

* * * * *

UNITED STATES PATENT OFFICE
CERTIFICATE OF CORRECTION

Patent No. 4,803,021　　　　　　　　　　Dated FEBRUARY 7, 1989

Inventor(s) Dennis L. Werth, Virupaksha K. Reddy

It is certified that error appears in the above-identified patent and that said Letters Patent is hereby corrected as shown below:

Patent reads

| Col. | Line | | |
|---|---|---|---|
| 2 | 42 | "moldrelease" should be | -- mold-release -- |
| 3 | 37 | "136-400 Å" should be | -- 136-4000 Å -- |
| 3 | 59 | "moldrelease" should be | -- mold-release -- |
| 3 | 66 | "silicone" should be | -- a silicone -- |
| 4 | 7 | "an" should be | -- and -- |
| 4 | 16 | "gneral," should be | -- general, -- |
| 5 | 41-42 | "LambdaPhysik" should be | -- Lambda-Physik -- |
| 5 | 46 | "attenuat" should be | -- attenuator -- |
| 5 | 47 | "as" should be | -- was -- |
| 7 | 11 | "Laer-" should be | -- Laser- -- |
| 7 | 20 | "an" should be | -- and -- |
| 7 | 47 | "Sprasil" should be | -- Suprasil -- |
| 8 | 13 | "(J/cm2)" should be | -- (J/cm$^2$) -- |
| 9 | 63-46 | "into preparation" should be | -- into a preparation -- |
| 3 | 59 | "(joules/cm2/sec)" should be | --(joules/cm$^2$/sec)--. |

Signed and Sealed this

Ninth Day of October, 1990

Attest:

HARRY F. MANBECK, JR.

Attesting Officer　　　Commissioner of Patents and Trademarks